United States Patent
Kahne et al.

(10) Patent No.: US 9,898,386 B2
(45) Date of Patent: Feb. 20, 2018

(54) DETECTING BYTE ORDERING TYPE ERRORS IN SOFTWARE CODE

(71) Applicants: Brian C. Kahne, Austin, TX (US); John H. Arends, Austin, TX (US); Richard G. Collins, Austin, TX (US); James C. Holt, Austin, TX (US)

(72) Inventors: Brian C. Kahne, Austin, TX (US); John H. Arends, Austin, TX (US); Richard G. Collins, Austin, TX (US); James C. Holt, Austin, TX (US)

(73) Assignee: NXP USA, INC., Austin, TX (US)

( * ) Notice: Subject to any disclaimer, the term of this patent is extended or adjusted under 35 U.S.C. 154(b) by 76 days.

(21) Appl. No.: 14/054,484

(22) Filed: Oct. 15, 2013

(65) Prior Publication Data

US 2015/0106793 A1  Apr. 16, 2015

(51) Int. Cl.
G06F 9/44 (2006.01)
G06F 11/36 (2006.01)

(52) U.S. Cl.
CPC .............. *G06F 11/3648* (2013.01)

(58) Field of Classification Search
CPC ................................... G06F 11/13
USPC ........................................... 717/130
See application file for complete search history.

(56) References Cited

U.S. PATENT DOCUMENTS

| | | | |
|---|---|---|---|
| 7,552,427 B2 | 6/2009 | Adiletta et al. | |
| 7,716,642 B1 * | 5/2010 | Michael et al. | 717/124 |
| 2002/0069339 A1 * | 6/2002 | Lasserre et al. | 711/201 |
| 2004/0054815 A1 * | 3/2004 | Carlton Broberg, III | 710/1 |
| 2004/0221274 A1 | 11/2004 | Bross et al. | |
| 2009/0249302 A1 * | 10/2009 | Xu | G06F 11/3636 717/128 |
| 2011/0154303 A1 | 6/2011 | Rice et al. | |
| 2012/0124560 A1 * | 5/2012 | Indukuru | G06F 8/4442 717/127 |
| 2013/0031420 A1 * | 1/2013 | Haverkamp | G06F 21/74 714/45 |
| 2013/0145055 A1 * | 6/2013 | Kegel et al. | 710/26 |

(Continued)

OTHER PUBLICATIONS

Carl Ek, "Detecting Endian Issues with Static Analysis Tools," Dr. Dobb's, http://www.drdobbs.com/windows/detecting-endian-issues-with-static-anal/226000073, Jul. 20, 2010, 3 pages.

*Primary Examiner* — Li B Zhen
*Assistant Examiner* — Bradford Wheaton (57) ABSTRACT

An approach is provided in which an endianness violation detection sub-system detects endianness violations between hardware units. The endianness violation detection sub-system tracks memory operations performed by multiple hardware units via debug channels and generates lookup table entries that are stored in a lookup table. When the endianness violation detection sub-system detects endianness relevant load attributes of a load operation that are different than corresponding endianness relevant store attributes of a store operation, the endianness violation detection sub-system generates an endianness violation. In one embodiment, the endianness violation detection sub-system identifies an endianness violation when the endianness violation detection sub-system detects a difference in the byte ordering type between a hardware unit performing a store operation and a hardware unit performing a load operation.

17 Claims, 9 Drawing Sheets

(56) References Cited

U.S. PATENT DOCUMENTS

2014/0006682 A1* 1/2014 Nanditale et al. ............ 711/102
2014/0089902 A1* 3/2014 Guthrie et al. ............... 717/128
2014/0281472 A1* 9/2014 Yalamanchili ................ 713/100

* cited by examiner

DETECTING BYTE ORDERING TYPE ERRORS IN SOFTWARE CODE

TECHNICAL FIELD

The present disclosure relates to detecting endianness errors in software code. More particularly, the present disclosure relates to identifying endianness conflicts in software code that is migrated from a first computer system to a second computer system having a different byte ordering endianness format.

BACKGROUND

Computer systems typically order bytes in computer memory in either a "big-endian" format or a "little-endian" format. A big endian format specifies the most significant byte (MSB) of multi-byte data in a lower address location of a memory entry, whereas the little endian format specifies the least significant byte (LSB) of the multi-byte data in the lower address location of a memory entry. Using address locations 0, 1, 2, and 3 and multi-byte data "ABCD" as an example, big endian ordering stores the data in the address locations as A→0 (MSB in lowest address location), B→1, C→2, and D→3, whereas little endian ordering stores the data in the address locations as D→0 (LSB in lowest address location), C→1, B→2, and A→3.

When a software developer writes software application code, the software developer typically knows the byte ordering endianness format of the software code's target computer system, which is important when the software developer writes code to load data from a specific byte location in memory (e.g., byte location "3"). This is especially true in multi-core systems when a first core stores multi-byte data in a shared memory location and a second core retrieves a portion of the multi-byte data from the same shared memory location.

On occasion, a software developer may migrate software code (or a portion of software code) developed for a first multi-core system onto a second multi-core system that utilizes a different byte ordering endianness format (e.g., for code reuse, lower cost computing device, etc.). As such, specific byte location memory operations between cores may result in one of the cores loading incorrect data when executing load operations.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

This disclosure provides an approach of utilizing run-time analysis hardware and hardware unit debug approaches to detect endianness violations that occur between store operations and load operations. An endianness violation detection sub-system tracks memory operations performed by hardware units (e.g., processor cores, hardware accelerators, etc.) by filtering and ordering memory operation debug data generated by the hardware units. The endianness violation detection sub-system receives load debug data corresponding to an executed load operation and determines whether the load operation's real data address range overlaps a previously executed store operation's real data address range. When the endianness violation detection sub-system detects overlapping real data address ranges between the load operation and store operation, the endianness violation detection sub-system compares endianness relevant load attributes to store attributes (e.g., compare the load data size to the store data size). The endianness violation detection sub-system, in turn, generates an endianness violation when a difference exists between the endianness relevant load attributes and store attributes. In one embodiment, the endianness violation detection sub-system also generates an endianness violation when a difference exists in the byte ordering type (e.g, endianness type) between a hardware unit performing the store operation (e.g., little endian) and a hardware unit performing the load operation (e.g., big endian).

Figure 1:
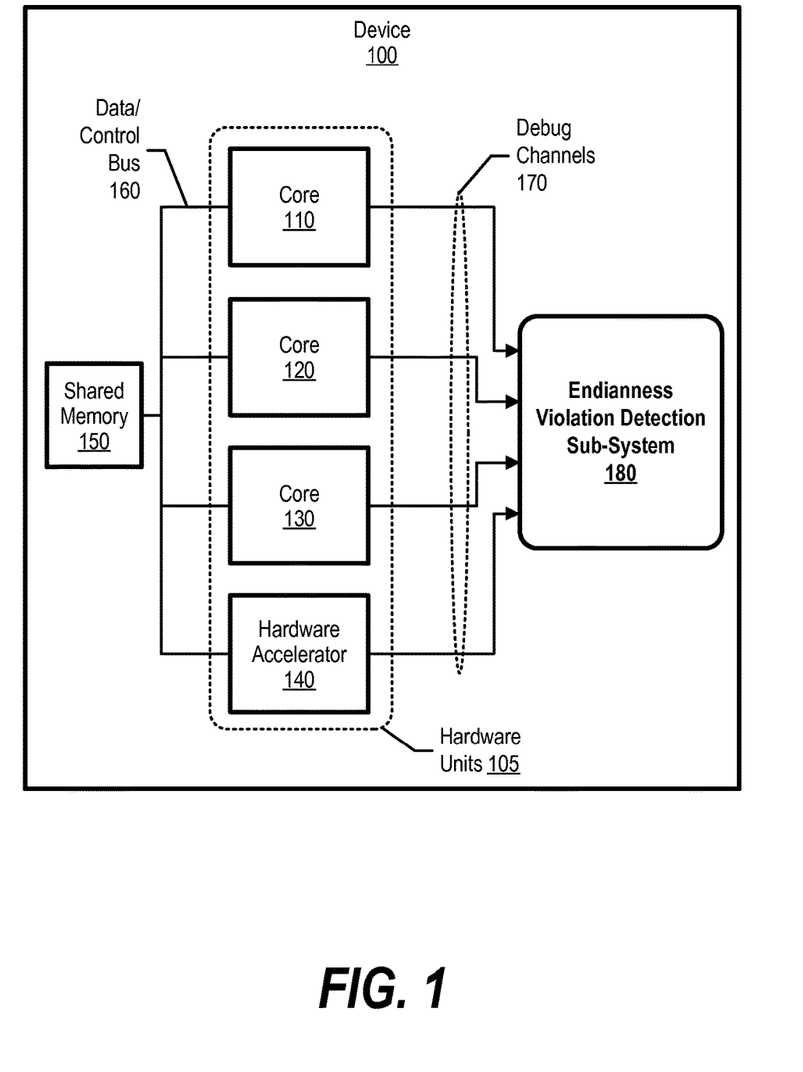
FIG. 1 is a diagram depicting one example of an endianness violation detection sub-system that analyzes debug data and detects endianness violations based upon the debug data.

FIG. 1 is a diagram depicting one example of an endianness violation detection sub-system that analyzes hardware unit debug data and detects endianness violations. As defined herein, a hardware unit may be a processing core, a hardware accelerator, or any other type of hardware device that loads and stores data from/to a shared memory area 150. FIG. 1 shows that device 100 includes four hardware units 105, which are processor core 110, processor core 120, processor core 130, and hardware accelerator 140. As those skilled in the art can appreciate, device 100 may have more, less, or different types of hardware units than what is depicted in FIG. 1.

Device 100's architecture is based upon a particular byte ordering endianness format, such as a big endian ordering format. When a developer migrates software originally designed for a computer system (or device) having a different byte ordering type (e.g., little endian) onto device 100, the developer utilizes endianness violation detection sub-system 180 to detect possible endianness violations between hardware units 105 as they execute the migrated code. For example, core 110 may store four bytes of data in shared memory 150 and core 120 may load one of the bytes of data from a specific byte location in shared memory 150. In this example, the one byte of data loaded from the specific byte location will be different between a big endian format and a little endian format (see FIGS. 2, 3, and corresponding text for further details). In one embodiment, the developer may also use endianness violation detection sub-system 180 to determine whether endianness violations will exist when software migrates from device 100 onto a device that has a different endianness format than device 100. Endianness violation detection sub-system 180 may be implemented in hardware, firmware, or a combination of hardware, firmware, and software.

Each of hardware units 105 loads and stores data from/to shared memory 150 via data/control bus 160 during normal execution. The load and store operations performed by the different hardware units may be synchronous or asynchronous in nature. In one embodiment, shared memory 150 may include multiple memories and may provide non-uniform memory sharing between hardware units. In this embodiment, endianness violations may occur from multiple hardware units 105 accessing a same memory area on one of the shared memories.

Each of hardware units 105 also generates debug data on a debug channel (debug channels 170), which feeds into endianness violation detection sub-system 180. In one embodiment, the debug data includes endianness relevant attributes such as a hardware unit identifier, a time stamp, and information necessary to identify endianness violations. For example, core 110 may store data in shared memory 150 during normal execution and send debug data to endianness violation detection sub-system 180 that includes core 110's ID, an effective/real data address of the memory operation, and an effective address of the store instruction.

When endianness violation detection sub-system 180 receives debug data from hardware units 105, endianness violation detection sub-system 180 proceeds to filter the debug data according to particular filter rules so that subsequent debug analysis stages are not overloaded. The filter rules, in one embodiment, may exclude or allow debug data based upon the hardware unit generating the debug data and/or effective instruction addresses (e.g., instruction program counter) corresponding to the debug data. In turn, the filtered debug data is time stamped and ordered accordingly (see FIGS. 4, 6, 7, and corresponding text for further details).

Endianness violation detection sub-system 180 stores, in order, store debug data corresponding to store operations as lookup table entries in a lookup table. Each of the store debug data lookup table entries includes, in one embodiment, a timestamp, a hardware unit ID, a byte ordering type identifier (e.g., big endian or little endian), an effective data address, a real data address, a size of the memory operation (e.g., number of bytes), and an instruction effective address (see FIG. 5 and corresponding text for further details). In turn, endianness violation detection sub-system 180 compares load debug data corresponding to load operations with the store debug data lookup table entries.

When endianness violation detection sub-system 180 receives load debug data, endianness violation detection sub-system 180 determines whether lookup table entry exists that has a real data address range (real data address+ data size) that overlaps the real data address range of the load debug data. If a lookup table entry exists that has an overlapping real data address range, endianness violation detection sub-system 180 compares endianness relevant load attributes of the load operation with endianness relevant store attributes of the store operation (stored in the lookup table). When a difference exists in the endianness relevant attributes, such as a difference in byte size and/or a difference in hardware unit byte ordering types, endianness violation detection sub-system 180 generates an endianness violation that includes the effective addresses of the load and store instructions. The endianness violations may then be subsequently analyzed by a code correlation system that identifies the instructions in source code that cause the potential endianness violation (see FIGS. 4, 8, and corresponding text for further details).

Figure 2:
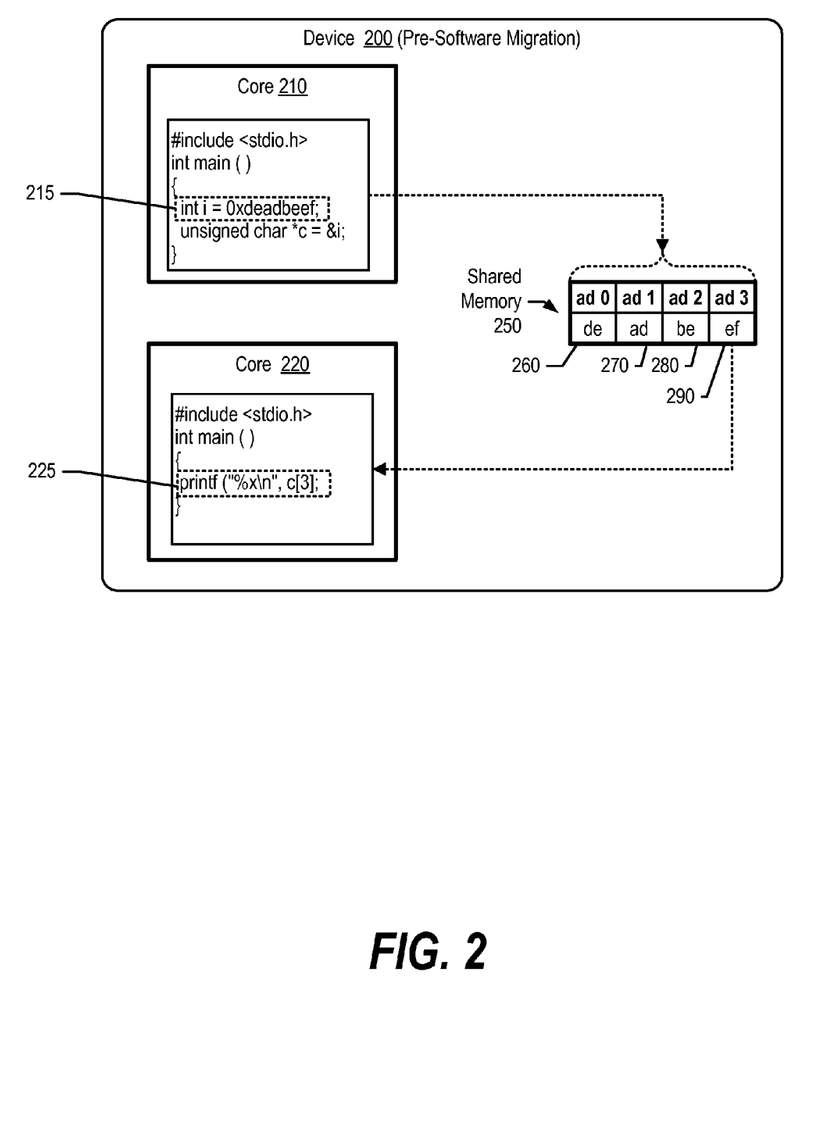
FIG. 2 is a diagram showing one example of a device executing software code prior to the software code migrating onto another device.
Figure 3:
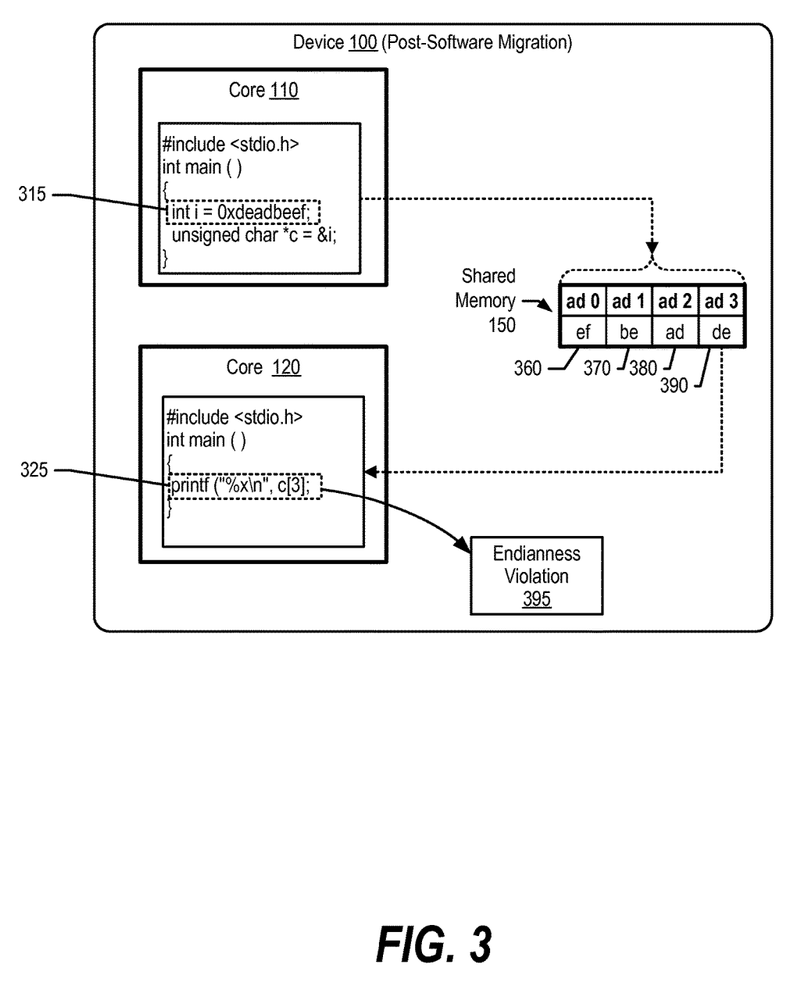
FIG. 3 is a diagram showing one example of a device executing migrated software code.

FIG. 2 is a diagram showing one example of a device executing software code prior to the software code migrating onto another device (shown in FIG. 3). A software developer may wish to migrate software code designed and executed on device 200 to device 100 (shown in FIGS. 1 and 3). FIGS. 2 and 3 show an example of when device 200 and device 100 execute the same software code based upon different endianness formats. The examples shown in FIG. 2 show device 200 adhering to a big endian format and device 100 adhering to a little endian format. As those skilled in the art can appreciate, a similar scenario exists when device 200 is based on a little endian format and device 100 is based on a big endian format.

Device 200 includes cores 210, 220, and shared memory 250. Software code executes on core 210, which includes instruction 215 that stores the hexadecimal value "deadbeef" into shared memory 250. Since core 210 operates according to a big endian format, the MSB "de" is placed in the lowest address location 260 (address 0); "ad" is placed in address location 270 (address 1); "be" is placed in address location 280 (address 2); and "ef" is placed in address location 290 (address 3).

When core 220 executes instruction 225, core 220 retrieves data from byte location "[3]," which is the value "ef" from address location 290. Since core 210's store operation is four bytes and core 220's load operation is one byte, conflicts arise when their corresponding software is migrated to a little endian formatted device (see FIG. 3 and corresponding text for further details).

FIG. 3 is a diagram showing one example of a device executing software code migrated from a device adhering to a different endianness format. Device 100 utilizes a little endian byte ordering format and executes code originally designed for device 200, which utilizes a big endian byte ordering format. FIG. 3 shows that when core 110 executes instruction 315 to store "deadbeef" in shared memory 150, the data is stored in opposite byte order than that shown in FIG. 2 due to the different byte ordering endianness between device 100 and device 200. As can be seen, "ef," which is the LSB, is stored in the lowest address location 360; "be" is stored in address location 370; "ad" is stored in address location 380; and "de" is stored in address location 390.

Endianness violation detection sub-system 180 generates an endianness violation (violation 395) when core 120 executes instruction 325 because store instruction 315 is four bytes of data and load instruction 325 is one byte of data. As can be seen, when core 120 executes instruction 325 to load the data from byte location "[3]," core 120 loads value "de" from address location 390, which is a different value than value "ef" loaded by core 220 shown in FIG. 2.

Figure 4:
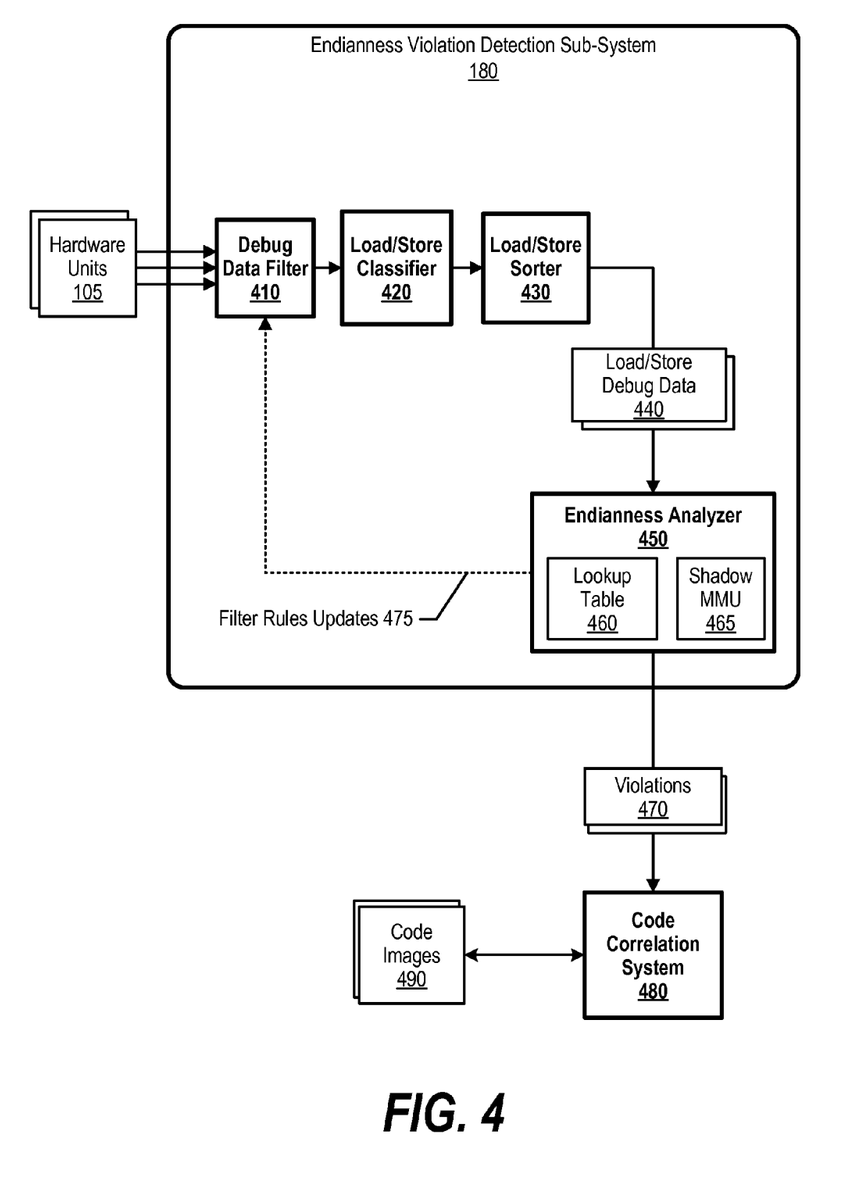
FIG. 4 is a diagram depicting one example of an endianness violation detection sub-system.

FIG. 4 is a diagram depicting one example of an endianness violation detection sub-system. Endianness violation detection sub-system 180 may receive a large amount of debug data from hardware units 105. As such, endianness violation detection sub-system 180 utilizes debug data filter 410 to filter the debug data according to filter rules, such as filtering load debug data and store debug data for particular memory address ranges that were generated by particular hardware units. In one embodiment, an initial set of filter rules are loaded in a rules storage area that are generated from a developer and/or a compiler/linker based upon directives and/or intrinsics (see FIGS. 6, 7, 8, and corresponding text for further details).

Load/store classifier 420 classifies (organizes) debug data attributes corresponding to the filtered memory operations (addresses, memory sizes, etc.), and timestamps the classified debug data accordingly. Load/store sorter 430 uses the timestamp to sort the debug data in order (ordered load/store debug data 440). In turn, load/store sorter 430 sends load/store debug data 440 in order of their corresponding timestamps to endianness analyzer 450 for further analysis (see FIG. 5 and corresponding text for further details). In one embodiment, endianness analyzer 450 is included in endianness violation detection sub-system 180. In another embodiment, endianness analyzer 450 is located external to device 100 and performs post-processing endianness violation analysis.

Endianness analyzer 450 stores store debug data corresponding to store operations as lookup table entries in lookup table 460. In turn, endianness analyzer 450 compares received load debug data corresponding to load operations with the lookup table entries (see FIG. 8 and corresponding text for further details). In one embodiment, endianness analyzer 450 uses shadow MMU (memory management unit) 465 to translate effective data addresses included in the debug data to real data addresses. The real data addresses allow endianness analyzer 450 to identify store operations and load operations that overlap in real memory. In this embodiment, shadow MMU 465 receives MMU update information through debug channels 170 to track actual MMU updates. As those skilled in the art can appreciate, shadow MMU 465 is a shadow copy of an MMU executing on device 100.

In one embodiment, based upon endianness analyzer 450's workload, endianness analyzer 450 provides filter rules updates 475 to debug data filter 410, which results in an increased or decreased amount of load/store debug data 440 (e.g., filter out debug data that includes addresses corresponding to an already detected endianness violation).

When endianness analyzer 450 determines, based upon the comparison discussed above, that the load operation's real data address range overlaps a previously executed store operation's real data address range (stored in a lookup table entry), endianness analyzer 450 compares endianness relevant load attributes to endianness relevant store attributes (e.g., compares the load data size to the store data size). When a difference is detected between the endianness relevant load attributes to the endianness relevant store attributes, endianness analyzer 450 sends violations 470 to code correlation system 480. In one embodiment, code correlation system 480 uses instruction effective addresses (e.g., instruction program counter values) included in violations 470 to correlate the identified endianness violations with source code using code images 490 (images of source code). In turn, code correlation system 480 informs a software developer as to the source code locations in the source code that are causing the endianness violations.

Figure 5:
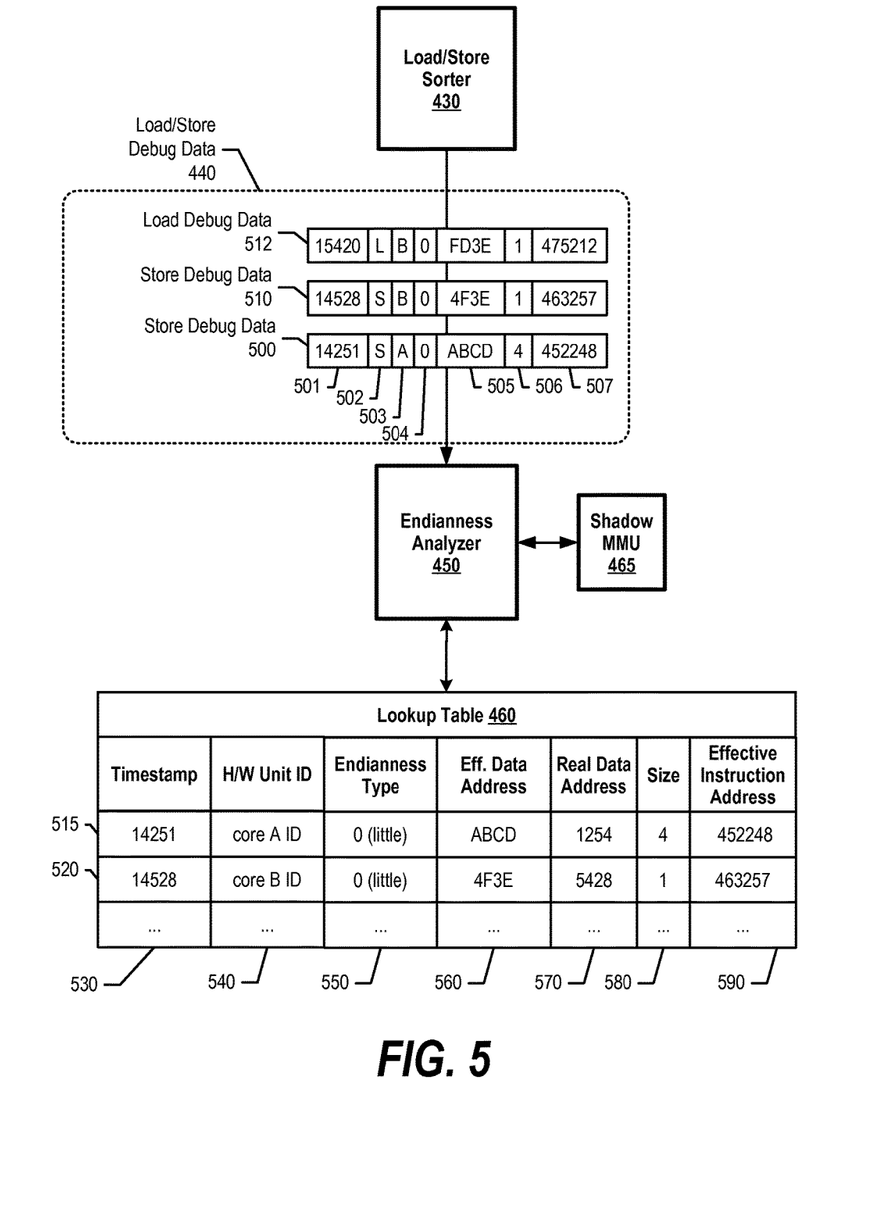
FIG. 5 is a diagram showing one example of a load/store sorter providing load/store debug data to an endianness analyzer for further analysis.

FIG. 5 is a diagram depicting one example of a load/store sorter providing memory operation debug data to an endianness analyzer. Load/store sorter 430 provides ordered load/store debug data 440 to endianness analyzer 450. Load/store debug data 440 includes debug data 500, 510, and 512, which correspond to three different memory operations.

Each of debug data 500, 510, and 512 includes attributes such as a timestamp, a memory operation type identifier (load or store), a hardware unit identifier, a byte ordering type (little endian or big endian), an effective data address, a memory size, and an effective instruction address. As can be seen, store debug data 500 includes timestamp 501 of "14251," memory operation type identifier 502 of "S" for a store operation, hardware type identifier 503 of "A" (to correspond with hardware unit A), byte ordering type 504 of "0" that identifies the byte ordering type of the corresponding hardware unit, effective data address 505 of "ABCD," memory size 506 of "4," and effective instruction address 507 of "452248."

The example shown in FIG. 5 shows that store debug data 500 and 510 include "S" memory operation type identifiers corresponding to store operations. As such, endianness analyzer 450 creates lookup table entries 515 and 520 in lookup table 460 based upon debug data 500 and 510, respectively. When debug data 500 and 510 do not include a real data address (as shown), endianness analyzer 450 uses shadow memory management unit (MMU) 465 to translate the effective data addresses to real data addresses and, in turn, endianness analyzer 450 includes the real data addresses in lookup table entries 515 and 520. As those skilled in the art can appreciate, shadow MMU 465 is a shadow copy of an MMU executing on device 100.

Lookup table 460, in one embodiment, includes columns 530-590. Column 530 includes timestamps of when the instructions executed, and column 540 includes hardware unit identifiers of the hardware units that executed the instruction. Column 550 includes byte ordering type identifiers of the hardware units that executed the instructions. In one embodiment, endianness analyzer 450 may compare byte ordering types between hardware units that execute corresponding store and load operations (having overlapping memory range areas) to determine whether an endianness violation exists. For example, one hardware unit may be executing a legacy block of code written in a big endian format, and another hardware unit may be executing recently migrated code developed in a little endian format.

Columns 560 and 570 include the effective data addresses and real data addresses of the store operations. Column 580 includes the size of the store operation. Entry 515 shows that the store operation corresponding to entry 515 is four bytes and the store operation corresponding to entry 520 is one byte. When endianness analyzer receives load debug data 512 (includes an "L" memory operation type identifier), endianness analyzer 450 looks for an entry in lookup table 460 that has a store real data address range that overlaps the load real data address range of debug data 512. For example, debug data 512 includes a load effective data address of "FD3E" and, assuming endianness analyzer 450 uses shadow MMU 465 to translate the load effective data address to a corresponding load real data address of "1254," the load real data address range of load debug data 512 is 1254 (one byte). Continuing with this example, endianness analyzer 450 identifies lookup table entry 515 as having an overlapping store real data address range because lookup table entry 515's store real data address is 1254, 1255, 1256, and 1257 (four bytes). Once endianness analyzer 450 identifies a store real data address range overlapping the load real data address range, endianness analyzer 450 determines whether corresponding endianness relevant store attributes are different than endianness relevant load attributes and, if a difference is determined, endianness analyzer 450 generates an endianness violation accordingly (see FIG. 8 and corresponding text for further details).

Column 590 includes effective instruction addresses of instructions executed by the hardware units to generate the corresponding debug data (included in debug data 440).

Endianness analyzer 450 includes the effective instruction addresses in violations 470 passed to code correlation system 480. In turn, code correlation system 480 uses code images 490 to determine source code locations in the actual source code that are causing the endianness violations (see FIG. 4 and corresponding text for further details).

Figure 6:
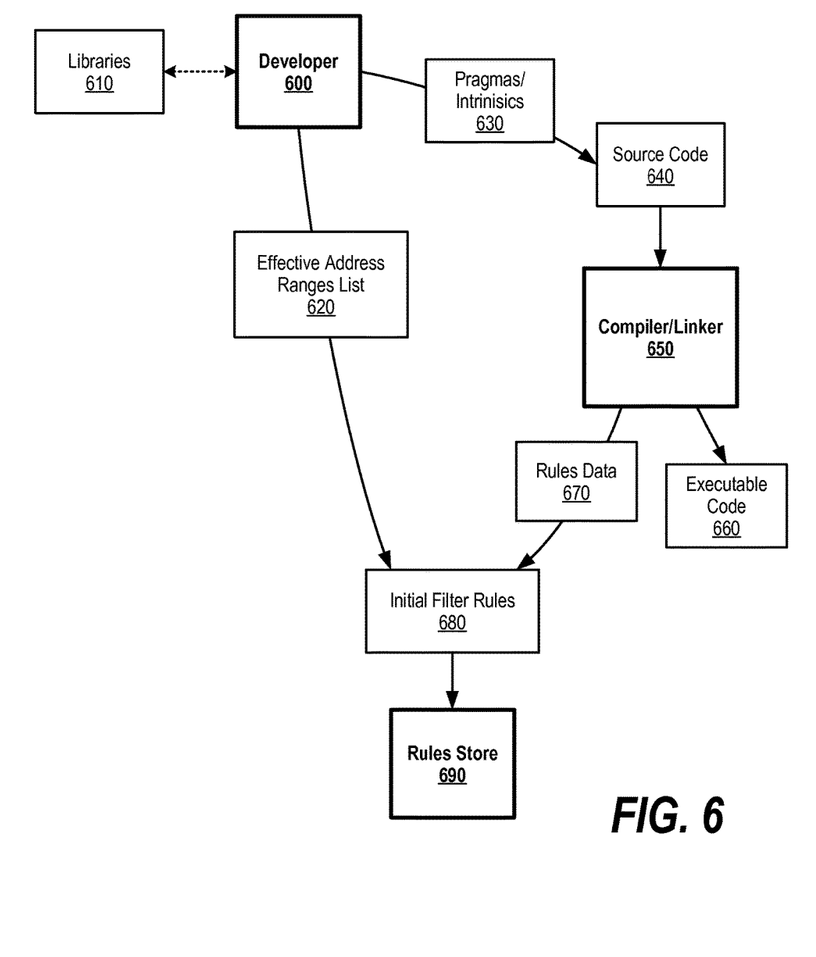
FIG. 6 is a flowchart showing one example of steps taken to generate an initial set of filter rules.

FIG. 6 is a diagram depicting one example of a developer and/or compiler/linker generating an initial set of filter rules. Software developer 600 analyzes libraries 610 (e.g., a C standard library or special purpose chip-specific library) and identifies a list of effective address ranges that endianness violation detection sub-system 180 should ignore (filter out), such as those corresponding to "memcpy" operations. In turn, developer 600 stores the list of effective address ranges in effective address ranges list 620 (e.g., a human readable text file). As those skilled in the art can appreciate, memcpy operations copy bytes from one region to another region. A memcpy operation may be ignored because the operation does not use the data, but rather just copies the data. Thus, a hardware unit may safely copy a block of integers without concern for an endianness violation. In one embodiment, software developer 600 is a human that manually identifies the list of effective addresses to ignore. In another embodiment, software developer 600 is an automated process that automatically identifies the list of effective addresses to ignore based upon content included in libraries 610.

Developer 600 also inserts directives/intrinsics 630 into source code 640, which is compiled by compiler/linker 650 to generate executable code 660 and rules data 670. In one embodiment, the directives mark a code scope "to be ignored." For example, the following pragma code instructs compiler/linker 650 to output a rule (rules data 670) that excludes an effective address range of instructions in a function "my_function( )." In turn, instructions in my_function that are loads or stores are filtered out (ignored) by debug data filter 410:

```
#pragma endian_safe
void my_function(void)
{
    // code statements
}.
```

Regarding intrinsics, intrinsics may be special code macros that are recognized by compiler/linker 650 and automatically expanded into a specific code, such as:

```
// any code sequence
__my_intrinsic( ) // intrinsic
// any code sequence.
```

In turn, a set of effective addresses for instructions that the intrinsic expands into by compiler/linker 650 are converted into rules to exclude instructions with such addresses (rules data 670). In one embodiment, rules data 670 and effective address range list 620 may both be text files. In this embodiment, they may be concatenated together to generate initial filter rules 680, which are stored in rules store 690 and utilized by debug data filter 410 to filter debug data received over debug channels 170.

In one embodiment, compiler/linker 650 are modified to provide rules data 670. In this embodiment, the compiler is modified to provide instruction ranges to the linker (based upon directives/intrinsics 630) that are to be excluded in the object code. As such, the linker is modified to receive the instruction ranges from the compiler and generate the final effective instruction addresses to exclude, which are included in rules data 670.

Figure 7:
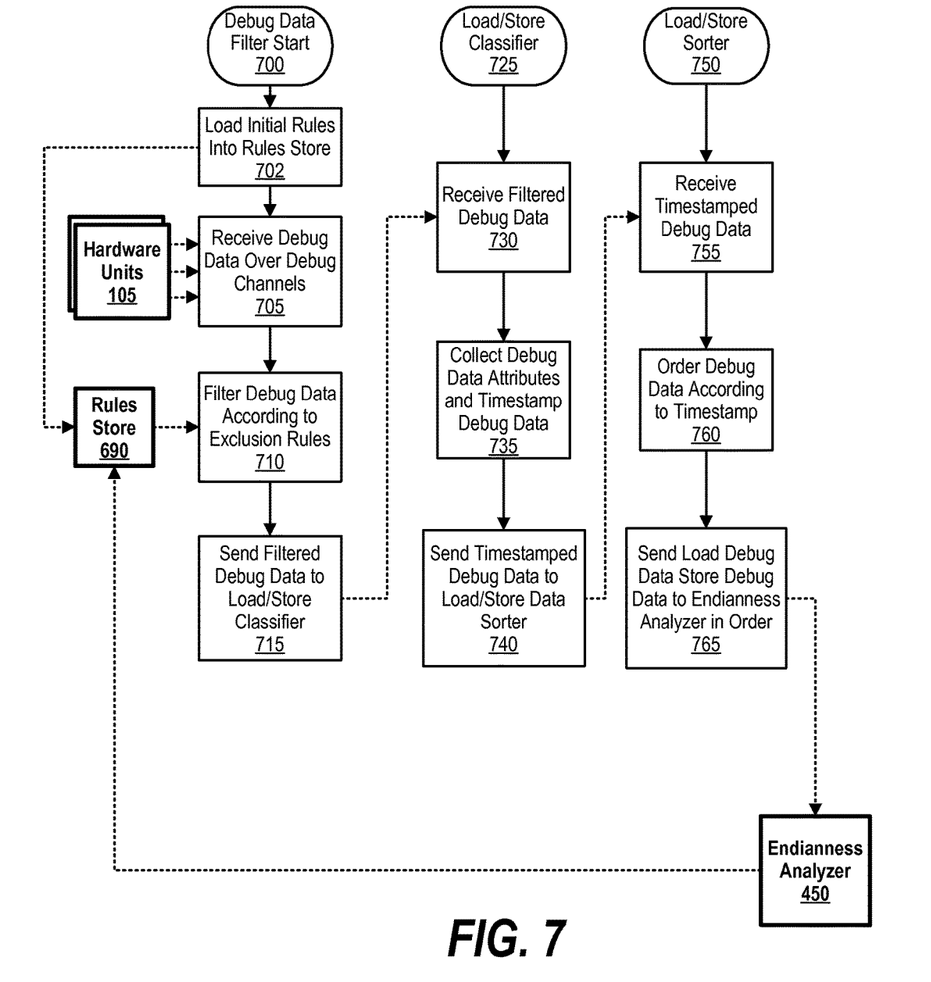
FIG. 7 is a flowchart showing one example of steps taken to filter and order debug data generated by multiple hardware units.

FIG. 7 is a flowchart showing one example of steps taken to filter and sort debug data. Debug data filtering commences at 700, whereupon the endianness violation detection subsystem's debug data filter 410 loads an initial set of rules in rules store 690 (702), such as initial rules 680 shown in FIG. 6. The debug data filter receives debug data from hardware units 105 (705) and filters the debug data according to the filter rules stored in rules store 690 at 710. As discussed below, the filter rules may be updated real-time by endianness analyzer based upon detected endianness violations. At 715, the debug data filter sends the captured (non-ignored) debug data to the endianness violation detection sub-system's load/store classifier 420.

Load/store classification commences at 725, whereupon the load/store classifier receives the filtered (captured) debug data at 730. At 735, the load/store classifier collects the debug data and time stamps the collected debug data (e.g., memory operation type, hardware unit ID, byte ordering type, effective data address, real data address, operation size, etc.). The load/store classifier sends the time stamped debug data to load/store sorter 430 for further processing (740).

Load/store sorter processing commences at 750, whereupon the load/store sorter receives the time stamped debug data at 755. At 760, the load/store sorter sorts the debug data in a "total order" according to the time stamps. For example, the debug data may include information corresponding to load operations and store operations generated from multiple hardware units. In this example, the load/sore sorter orders the debug data according to their occurrence relative to each other (via the time stamps). The load/store sorter, in turn, sends the ordered load/store debug data to endianness analyzer 450 for further analysis (765).

In one embodiment, endianness analyzer 450 updates filter rules in rules store 690 based upon the received debug data. For example, once a violation has been detected for a particular instruction effective address of a particular hardware unit, endianness analyzer 450 is not required to continue reporting violations for that particular hardware unit's particular instruction effective address. As such, endianness analyzer 450 may generate a filter rule to block subsequent debug data that corresponds to the particular hardware unit's particular instruction effective address. As those skilled in the art can appreciate, the steps shown in FIG. 7 may be performed by a single entity instead of three separate entities as discussed above.

Figure 8:
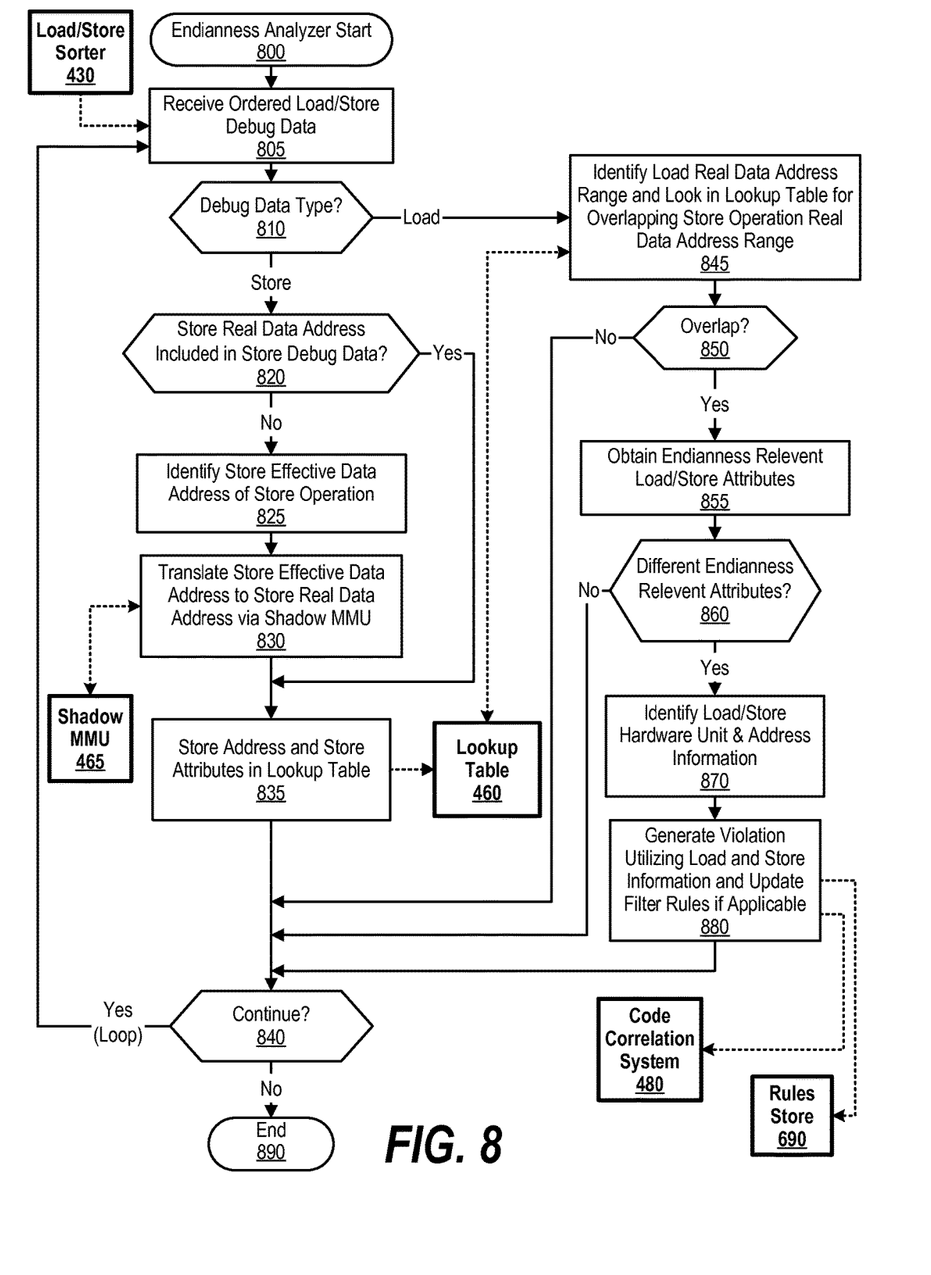
FIG. 8 is a diagram showing one example of steps taken by an endianness analyzer to detect endianness violations between hardware units.

FIG. 8 is a flowchart showing one example of steps taken by an endianness analyzer to detect endianness violations between hardware units. Processing commences at 800, whereupon the endianness analyzer receives load/store debug data from load store sorter 430 at 805.

The endianness analyzer determines whether the debug data is load debug data or store debug data based upon a memory operation type identifier included in the debug data (810). If the debug data is store debug data, decision 810 branches to the "Store" branch, whereupon the endianness analyzer determines whether the corresponding store operation's real data address is included in the store debug data (820). If the store operation's real data address is included in the store debug data, decision 820 branches to the "Yes" branch, bypassing a real data address lookup process.

On the other hand, if the store operation's real data address is not included in the store debug data, decision 820 branches to the "No" branch, whereupon the endianness analyzer identifies the store operation's effective data address in the store debug data (825) and, at 830, the endianness analyzer uses shadow MMU 465 to translate the store effective data address to a store real data address (see FIG. 4 and corresponding text for further details).

Once the endianness analyzer knows the store operation's real data address, either acquired from the store debug data or provided by shadow MMU 465, the endianness analyzer stores the real data address and other endianness relevant store attributes corresponding to the store operation in lookup table 460 (835). In one embodiment, the endianness relevant store attributes may include a timestamp of the store operation; a hardware unit identifier that identifies a processor core or hardware accelerator that executed the store operation; a byte ordering type of the hardware unit that executed the store operation (big endian format or little endian format); the effective data address; the real data address; the size of the store operation; and the effective instruction address (see FIG. 5 and corresponding text for further details).

Referring back to decision 810, when the debug data is load debug data, decision 810 branches to the "Load" branch, whereupon the endianness analyzer looks in lookup table 460 at 845 for an entry that includes a real data address memory range that overlaps the load debug data's real data address memory range. For example, lookup table 460 may include store attributes corresponding to a store operation to real data address "4FE2" for four bytes (store real data address memory range of 4FE2 to 4FE5 (four bytes)), and the load debug data may identify a load operation from the same real address "4FE2" for one byte (load real data address memory range of 4FE2 (1 byte)). In one embodiment, when the debug data does not include a real data address of the load operation, the memory analyzer uses shadow MMU 465 to translate the load operation's effective data address to a load real data address as discussed earlier with respect to translating the store operation's effective data address to a real data address.

The endianness analyzer determines if an entry exists in lookup table 460 that includes a store real data address memory range that overlaps the load debug data's corresponding load real data address range (decision 850). If lookup table 460 does not include an overlapping store real data address range, decision 850 branches to the "No" branch, bypassing an endianness violation checking process. Situations that may cause lookup table 460 to not include an overlapping store operation entry prior to a load operation may be due to a programming error, or the store operation was pre-filtered (e.g., the data at the real address location was populated by a call to memcpy( )) In either case, such situations may not be considered an endianness violation.

On the other hand, if an overlapping store real data address range exists in an entry included in lookup table 460, decision 850 branches to the "Yes" branch, whereupon the endianness analyzer obtains endianness relevant load attributes from the load debug data (860) (size, byte ordering type of hardware identifier, etc.) and determines whether the lookup table entry corresponding to the overlapping store real data address range includes endianness relevant store attributes that are different than the endianness relevant load attributes (decision 860). In one embodiment, the endianness analyzer checks whether the size of the store operation is different than the size of the load operation. In another embodiment, the endianness analyzer checks whether a difference exists in byte ordering types between the hardware unit executing the store instruction and the hardware unit executing the load instruction (e.g., both big endian type or both little endian type).

If the store debug data and the load debug data have one or more different endianness relevant attributes, decision 860 branches to the "Yes" branch, whereupon the endianness analyzer identifies the hardware units that performed the load/store operations along with other endianness relevant attribute information at 870, such as the effective instruction addresses corresponding to the store operation and load operation.

Next, the endianness analyzer generates an endianness violation at 880 that includes hardware unit identifiers that performed the memory operations along with the effective addresses corresponding to the load instruction and the store instruction. The endianness violation is sent to code correlation system 480 that, in turn, identifies both instructions' corresponding source code locations (see FIG. 4 and corresponding text for further details). In addition, the endianness analyzer may update the filter rules in rules store 690 based upon the endianness violation. For example, once the endianness analyzer generates an endianness violation for a particular instruction effective address of a particular hardware unit, the endianness analyzer is not required to continue reporting violations for that particular hardware unit's particular instruction effective address. As such, the endianness analyzer may generate/update a filter rule to block subsequent debug data that corresponds to the particular hardware unit's particular instruction effective addresses.

The endianness analyzer determines whether to continue monitoring debug channels for memory operations (840). If the endianness analyzer determines to continue monitoring the debug channels, decision 840 branches to the "Yes" branch, which loops back to detect and process the next memory operation. This looping continues until the endianness analyzer determines to terminate debug channel monitoring (e.g., the software developer terminates software debug), at which point decision 840 branches to the "No" branch, whereupon processing ends at 890.

According to one embodiment of the present disclosure, an endianness violation detection sub-system receives load debug data that includes endianness relevant load attributes. The load debug data is generated by a first hardware unit executing a load operation corresponding to a load real data address range. The endianness violation detection sub-system identifies a store real data address range in a lookup table that overlaps the load real data address range. The store real data address range corresponds to store debug data (includes endianness relevant store attributes) generated in response to executing a store operation. In turn, the endianness violation detection sub-system determines that one of the endianness relevant load attributes is different than one of the endianness relevant store attributes and generates an endianness violation accordingly.

According to another embodiment of the present disclosure, the endianness violation detection sub-system determines that a load size corresponding to the load operation is different than a store size corresponding to the store operation. According to yet another embodiment of the present disclosure. The endianness violation detection sub-system retrieves a load real data address corresponding to the load operation and identifies the load real data address range utilizing the load real data address and the load size. In this embodiment, the endianness violation detection sub-system also retrieves a store real data address corresponding to the store operation and identifies the store real data address range utilizing the store real data address and the store size.

According to yet another embodiment of the present disclosure, the store operation is executed by a second hardware unit that is different than the first hardware unit.

According to yet another embodiment, the endianness violation detection sub-system determines that a first byte ordering type identifier corresponding to the first hardware unit is different than a second byte ordering type identifier corresponding to the second hardware unit.

According to yet another embodiment of the present disclosure, the endianness violation detection sub-system extracts a store effective data address from the store debug data and translates the store effective data address to a store real data address using a shadow memory management unit.

According to yet another embodiment of the present disclosure, the endianness violation detection sub-system identifies a load effective instruction address of a load instruction corresponding to the load operation and identifies a store effective instruction address of a store instruction corresponding to the store operation. In turn, the endianness violation detection sub-system includes the store effective instruction address and the load effective instruction address in the endianness violation.

According to yet another embodiment of the present disclosure, a code correlation system correlates the load effective instruction address to a first source code address corresponding to the load operation, and correlates the store effective instruction address to a second source code address corresponding to the store operation.

According to yet another embodiment of the present disclosure, the endianness violation detection sub-system receives debug data from hardware units over debug channels and filters the debug data according to one or more filter rules. According to yet another embodiment of the present disclosure, the endianness violation detection sub-system generates a first filter rule that filters out subsequent debug data corresponding to the first hardware unit and the load real data address range, and generates a second filter rule that filters out the subsequent debug data corresponding to the store real data address range.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, a software embodiment (including firmware, resident software, micro-code, etc.), including processing circuitry for executing thereof, or an embodiment combining software and hardware aspects that may all generally be referred to herein as a "circuit," "module" or "system."

Furthermore, aspects of the present disclosure may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program, in a non-transitory fashion, for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
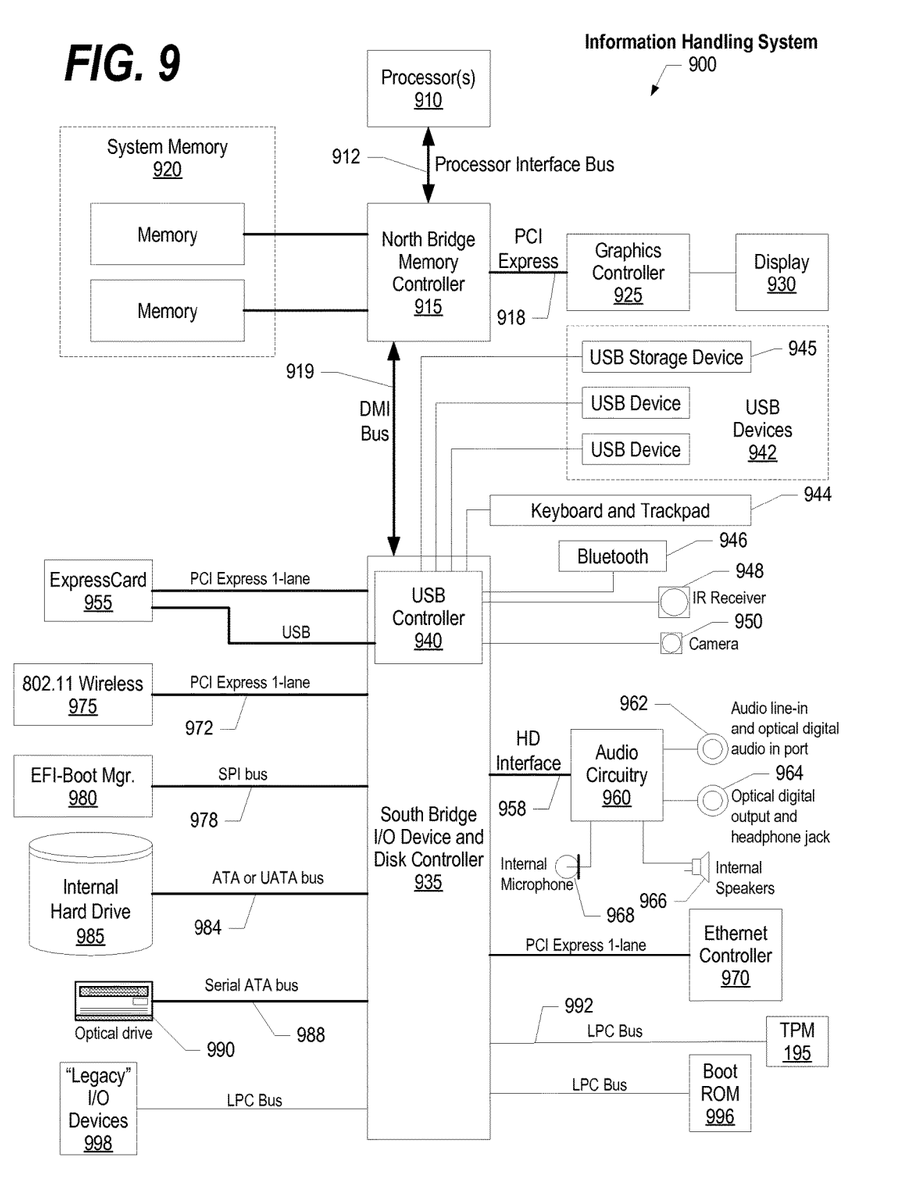
FIG. 9 illustrates a simplified example of a computer system capable of performing the computing operations described herein.

FIG. 9 illustrates information handling system 900, which is a simplified example of a computer system capable of performing the computing operations described herein. Information handling system 900 includes one or more processors 910 coupled to processor interface bus 912. Processor interface bus 912 connects processors 910 to Northbridge 915, which is also known as the Memory Controller Hub (MCH). Northbridge 915 connects to system memory 920 and provides a means for processor(s) 910 to access the system memory. Graphics controller 925 also connects to Northbridge 915. In one embodiment, PCI Express bus 918 connects Northbridge 915 to graphics controller 925. Graphics controller 925 connects to display device 930, such as a computer monitor.

Northbridge 915 and Southbridge 935 connect to each other using bus 919. In one embodiment, the bus is a Direct Media Interface (DMI) bus that transfers data at high speeds in each direction between Northbridge 915 and Southbridge 935. In another embodiment, a Peripheral Component Interconnect (PCI) bus connects the Northbridge and the Southbridge. Southbridge 935, also known as the I/O Controller Hub (ICH) is a chip that generally implements capabilities that operate at slower speeds than the capabilities provided by the Northbridge. Southbridge 935 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 996 and "legacy" I/O devices (using a "super I/O" chip). The "legacy" I/O devices (998) can include, for example, serial and parallel ports, keyboard, mouse, and/or a floppy disk controller. The LPC bus also connects Southbridge 935 to Trusted Platform Module (TPM) 995. Other components often included in Southbridge 935 include a Direct Memory Access (DMA) controller, a Programmable Interrupt Controller (PIC), and a storage device controller, which connects Southbridge 935 to nonvolatile storage device 985, such as a hard disk drive, using bus 984.

ExpressCard 955 is a slot that connects hot-pluggable devices to the information handling system. ExpressCard 955 supports both PCI Express and USB connectivity as it connects to Southbridge 935 using both the Universal Serial Bus (USB) the PCI Express bus. Southbridge 935 includes USB Controller 940 that provides USB connectivity to devices that connect to the USB. These devices include webcam (camera) 950, infrared (IR) receiver 948, keyboard and trackpad 944, and Bluetooth device 946, which provides for wireless personal area networks (PANs). USB Controller 940 also provides USB connectivity to other miscellaneous USB connected devices 942, such as a mouse, removable nonvolatile storage device 945, modems, network cards, ISDN connectors, fax, printers, USB hubs, and many other types of USB connected devices. While removable nonvolatile storage device 945 is shown as a USB-connected device, removable nonvolatile storage device 945 could be connected using a different interface, such as a Firewire interface, etcetera.

Wireless Local Area Network (LAN) device 975 connects to Southbridge 935 via the PCI or PCI Express bus 972. LAN device 975 typically implements one of the IEEE 802.11 standards of over-the-air modulation techniques that all use the same protocol to wireless communicate between information handling system 900 and another computer system or device. Optical storage device 990 connects to Southbridge 935 using Serial ATA (SATA) bus 988. Serial ATA adapters and devices communicate over a high-speed serial link. The Serial ATA bus also connects Southbridge 935 to other forms of storage devices, such as hard disk drives. Audio circuitry 960, such as a sound card, connects to Southbridge 935 via bus 958. Audio circuitry 960 also provides functionality such as audio line-in and optical digital audio in port 962, optical digital output and headphone jack 964, internal speakers 966, and internal microphone 968. Ethernet controller 970 connects to Southbridge 935 using a bus, such as the PCI or PCI Express bus. Ethernet controller 970 connects information handling system 900 to a computer network, such as a Local Area Network (LAN), the Internet, and other public and private computer networks.

While FIG. 9 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present.

The invention claimed is:

1. A method comprising:
   retrieving, by at least one of one or more processors included in an endianness violation detection subsystem a load real data address corresponding to a load operation, and a store real data address corresponding to a store operation;
   retrieving, by at least one of the one or more processors, a load size corresponding to the load operation and a store size corresponding to the store operation;
   computing, by the one or more processors, a load real data address range based upon the load real data address and the load size and a store real data address range based upon the store real data address and the store size that overlaps the lead real data address range; wherein the store real data address range is included in store debug data generated by a first hardware unit in response to execution of the store operation, and wherein the load real data address range is included in load debug data generated by a second hardware unit in response to execution of the load operation;

determining, by at least one of the one or more processors, that at least one endianness relevant load attribute corresponding to the load operation is different than at least one endianness relevant store attribute corresponding to the store operation, the load size included in the one or more endianness relevant load attributes and the store size included in the one or more endianness relevant store attributes;

generating an endianness violation, by at least one of the one or more processors, in response to the determination;

filtering out, based on a first filter rule, future store debug data generated by the first hardware that corresponds to the store real data address range, wherein the future store debug data is located by one or more of the processors subsequent to the generation of the endianness violation; and ignoring, by the one or more processors, the filtered out future store debug data.

2. The method of claim 1 further comprising:
determining that the load size is different than the store size; and
performing the generation of the endianness violation in response to the determination that the load size is different than the store size.

3. The method of claim 1 wherein, prior to the locating of the store real data address range that overlaps the load real data address range, the method further comprises:
obtaining, by at least one of the one or more processors, the future store debug data from the first hardware unit over one of a plurality of debug channels;
extracting, by at least one of the one or more processors, a store effective data address from the store debug data;
translating the store effective data address to a store real data address using a shadow memory management unit, wherein the shadow memory management unit receives memory management unit update information over one or more of the plurality of debug channels; and
storing the received store debug data and the store real data address in a lookup table entry.

4. The method of claim 1 wherein the first hardware unit executes the store operation and generates the store debug data, and wherein the second hardware unit executes the load operation and generates the load debug data.

5. The method of claim 4 further comprising:
retrieving, by at least one of the one or more processors, a first byte ordering type identifier corresponding to the first hardware unit, the first byte ordering type identifier included in the one or more endianness relevant store attributes;
retrieving a second byte ordering type identifier corresponding to the second hardware unit, the second byte ordering type identifier included in the one or more endianness relevant load attributes; and
generating the endianness violation in response to determining that the first byte ordering type identifier is different than the second byte ordering type identifier.

6. The method of claim 4 wherein the first hardware unit and the second hardware unit are different hardware unit types selected from the group consisting of a processor core and a hardware accelerator.

7. The method of claim 4 further comprising:
filtering, by at least one of the one or more processors, unfiltered debug data according to the first filter rule.

8. The method of claim 7 wherein, in response to generating the endianness violation, the method further comprises:
generating a second filter rule that filters out different debug data generated by the second hardware unit and corresponds to the load real data address range.

9. The method of claim 1 further comprising:
determining, by at least one of the one or more processors, a load effective instruction address of a load instruction and a store effective instruction address of a store instruction, the load instruction corresponding to the load operation and the store instruction corresponding to the store operation; and
including the load effective instruction address and the store effective instruction address in the endianness violation.

10. The method of claim 9 further comprising:
correlating, by a code correlation system, the load effective instruction address to a first source code address corresponding to the load instruction; and
correlating, by the code correlation system, the store effective instruction address to a second source code address corresponding to the store instruction.

11. A system comprising:
one or more hardware units;
one or more memories accessible by at least one of the one or more hardware units; and endianness analyzer circuitry configured to:
retrieve a load real data address corresponding to a load operation, and a store real data address corresponding to a store operation;
retrieve a load size corresponding to the load operation and a store size corresponding to the store operation;
compute a load real data address range based upon the load real data address and the lead size and a store real data address range based upon the store real data address that overlaps the load real data address range, wherein the store real data address range is included in store debug data generated by a first one of the one or more hardware units in response to execution of the store operation, and wherein the load real data address range is included in load debug data generated by a second one of the one or more hardware units in response to execution of the load operation;
determine that at least one endianness relevant load attribute corresponding to the load operation is different than at least one endianness relevant store attribute corresponding to the store operation, the lead size included in the one or mere endianness relevant lead attributes and the store size included in the one or more endianness relevant store attributes;
generate an endianness violation in response to the determination;
and determine a load effective instruction address of a load instruction and a store effective instruction address of a store instruction, the load instruction corresponding to the load operation and the store instruction corresponding to the store operation;
include the load effective instruction address and the store effective instruction address in the endianness violation;
correlate, by a code correlation system, the load effective instruction address to a first source code address corresponding to the load instruction;
correlate; by the code correlation system, the store effective instruction address to a second source code address corresponding to the store instruction;
filter out, based on a first filter rule, future store debug data generated by the one or more hardware units that corresponds to the store real data address range, wherein the future store debug data is located by the one or more hardware units subsequent to the generation of the endianness violation; and ignore the filtered out future store debug data.

12. The system of claim 11 wherein the endianness analyzer circuitry is further configured to:
  determine that the bad size is different than the store size; and
  perform the generation of the endianness violation in response to the determination that the load size is different than the store size.

13. The system of claim 11 wherein the endianness analyzer circuitry is further configured to:
  obtain the store debug data from the one or more hardware units over one of a plurality of debug channels prior to the locating of the store real data address range that overlaps the load real data address range;
  extract a store effective data address from the future store debug data;
  translate the store effective data address to a store real data address using a shadow memory management unit, wherein the shadow memory management unit receives memory management unit update information over one or more of the plurality of debug channels; and
  store the received store debug data and the store real data address in a lookup table entry.

14. The system of claim 11 wherein the endianness analyzer circuitry is further configured to:
  retrieve a first byte ordering type identifier corresponding to a first hardware unit that generates the store debug data, the first byte ordering type identifier included in the one or more endianness relevant store attributes;
  retrieve a second byte ordering type identifier corresponding to a second hardware unit that generates the load debug data, the second byte ordering type identifier included in the one or more endianness relevant load attributes; and
  generate the endianness violation in response to determining that the first byte ordering type identifier is different than the second byte ordering type identifier.

15. The system of claim 14 wherein the first hardware unit and the second hardware unit are different hardware unit types selected from the group consisting of a processor core and a hardware accelerator.

16. The system of claim 14 wherein the endianness analyzer circuitry is further configured to:

generate a second filter rule that filters out different debug data generated by the second hardware unit and corresponds to the load real data address range.

17. A device comprising:
  a plurality of hardware units;
  a shared memory area accessible by one or more of the plurality of hardware units; and
  an endianness violation detection sub-system, communicatively coupled to the plurality of hardware units by corresponding debug channels and configured to:
  retrieve a load real data address corresponding to a load operation, and a store real data address corresponding to a store operation;
  retrieve a load size corresponding to the load operation and a store size corresponding to the store operation;
  compute a load real data address range based upon the load real data address and the load size and a store real data address range based upon the store real data address that overlaps the load real data address range, wherein the store real data address range is included in store debug data generated by a first one of the plurality of hardware units in response to execution of the store operation, and wherein the load real data address range is included in load debug data generated by a second one of the plurality of hardware units in response to execution of the load operation;
  determine that at least one endianness relevant load attribute corresponding to the load operation is different than at least one endianness relevant store attribute corresponding to the store operation, the load size included in the one or more endianness relevant load attributes and the store size included in the one or more endianness relevant store attributes;
  generate are endianness violation, by at least one of the one or more processors, in response to the determination; and
  filter out, based on a first filter rule, future store debug data generated by the one or more hardware units that corresponds to the store real data address range, wherein the future store debug data is located by one or more of the plurality of hardware units subsequent to the generation of the endianness violation; and
  ignore the filtered out future store debug data.

* * * * *